(12) United States Patent
Zirkel et al.

(10) Patent No.: US 11,079,263 B2
(45) Date of Patent: Aug. 3, 2021

(54) APPARATUSES AND METHODS FOR EVALUATING A SIGNAL EMITTED BY A ROTATIONAL ANGLE SENSOR

(71) Applicant: Robert Bosch GmbH, Stuttgart (DE)

(72) Inventors: Daniel Zirkel, Wiernsheim-Serres (DE); Michael Ungermann, Darmstadt (DE); Benjamin Lechner, Neuhausen (DE); Daniel Raichle, Vaihingen (DE); Edwin Eberlein, Stuttgart (DE); Tim Bruckhaus, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 801 days.

(21) Appl. No.: 15/736,036

(22) PCT Filed: Jun. 13, 2016

(86) PCT No.: PCT/EP2016/063467
§ 371 (c)(1),
(2) Date: Dec. 13, 2017

(87) PCT Pub. No.: WO2016/202728
PCT Pub. Date: Dec. 22, 2016

(65) Prior Publication Data
US 2018/0172486 A1  Jun. 21, 2018

(30) Foreign Application Priority Data
Jun. 18, 2015  (DE) .................... 10 2015 211 258.6

(51) Int. Cl.
*G01D 18/00*  (2006.01)
*H02K 24/00*  (2006.01)
(Continued)

(52) U.S. Cl.
CPC ............... *G01D 18/00* (2013.01); *G01D 5/20* (2013.01); *G01D 5/24457* (2013.01); *H02K 24/00* (2013.01); *G01B 7/30* (2013.01)

(58) Field of Classification Search
CPC . G01B 7/30; G01D 18/00; G01D 5/20; G01D 5/24457; H02K 24/00
See application file for complete search history.

(56) References Cited

U.S. PATENT DOCUMENTS 5,900,709 A * 5/1999 Kanda ....................... G05B 1/06
318/400.12
5,939,630 A * 8/1999 Nozoe ................. G01C 19/5607
73/1.77
(Continued)

FOREIGN PATENT DOCUMENTS

CN     102089628 A      6/2011
DE     102011078583    1/2013
(Continued)

OTHER PUBLICATIONS

International Search Report for Application No. PCT/EP2016/063467 dated Aug. 11, 2016 (English Translation, 3 pages).

*Primary Examiner* — Catherine T. Rastovski
*Assistant Examiner* — Liam R Casey
(74) *Attorney, Agent, or Firm* — Michael Best & Friedrich LLP

(57) ABSTRACT

The present invention relates to a double analysis of signals emitted by a rotational angle sensor. For this purpose, the signal emitted by the rotational angle sensor is processed in a first signal path with respect to a maximum angle quality of the angle signal to be calculated. A second signal path for processing the signal emitted by the rotational angle sensor is optimized to indicate a maximum diagnosability of errors.

10 Claims, 2 Drawing Sheets

(51) Int. Cl.
    *G01D 5/20*       (2006.01)
    *G01B 7/30*       (2006.01)
    *G01D 5/244*     (2006.01)

(56) References Cited

U.S. PATENT DOCUMENTS

| | | | | |
|---|---|---|---|---|
| 6,205,838 | B1* | 3/2001 | Schmid | G01C 19/56 |
| | | | | 73/1.37 |
| 8,156,806 | B1* | 4/2012 | Cardarelli | G01C 21/16 |
| | | | | 73/511 |
| 9,419,642 | B1* | 8/2016 | Nguyen | H03M 3/42 |
| 2004/0001016 | A1* | 1/2004 | Nunnally | H03M 1/32 |
| | | | | 341/137 |
| 2004/0204872 | A1* | 10/2004 | Kato | G01C 19/56 |
| | | | | 702/56 |
| 2014/0142782 | A1 | 5/2014 | Fu et al. | |
| 2014/0195577 | A1* | 7/2014 | Nikitin | H03H 17/0201 |
| | | | | 708/304 |
| 2014/0262634 | A1* | 9/2014 | Yamasaki | F16D 65/14 |
| | | | | 188/72.1 |
| 2015/0070002 | A1* | 3/2015 | Schott | G01D 5/145 |
| | | | | 324/207.2 |
| 2015/0100264 | A1 | 4/2015 | Qian | |

FOREIGN PATENT DOCUMENTS

| | | |
|---|---|---|
| JP | 2012122963 A | 6/2012 |
| WO | 0163739 | 8/2001 |
| WO | 2008036921 | 3/2008 |

* cited by examiner

APPARATUSES AND METHODS FOR EVALUATING A SIGNAL EMITTED BY A ROTATIONAL ANGLE SENSOR

BACKGROUND OF THE INVENTION

The present invention relates to an apparatus and a method for evaluating a signal of a rotational angle sensor.

Electric and hybrid vehicles are increasingly gaining importance. In order to regulate permanently excited synchronous machines (PSM) and electrically excited synchronous machines (ESM), as are used in such vehicles, knowledge of the rotor position angle of such machines is required. Furthermore, knowledge of the electrical frequency of the drive is necessary for the regulation of asynchronous machines (ASM). In order to determine the rotor position angle, or the electrical frequency, various types of sensors may be used. For example, sensors based on the eddy-current effect, resolvers or digital angle sensors are possible.

A resolver is in this case, for example, excited with a preferably sinusoidal carrier signal. As receiver signals of the resolver, perturbed amplitude-modulated voltages are in this case generally obtained, from the envelopes of which the information about the rotor position can be obtained.

For example, German Patent Application DE 10 2011 078 583 A1 discloses evaluation of resolver-sensor signals in a vehicle. To this end, a resolver picks up a rotational movement of a rotor and a processor element processes the sinusoidal or cosinusoidal output signals of the resolver.

Because of the great importance of the angle signals for the regulation of machines or drives, it is desirable to detect errors occurring in the rotational angle sensor or the signal path and the postprocessing logic as early and reliably as possible.

There is therefore a need for an apparatus and a method for evaluating a signal of a rotational angle sensor, which can identify possible perturbations or errors in the determination of a rotor angle. There is furthermore a need for reliable, but at the same time simple and economical, evaluation of the rotor angle determination.

SUMMARY OF THE INVENTION

To this end, according to a first aspect, the present invention provides an apparatus for evaluating a signal of a rotational angle sensor.

Accordingly, the present invention provides an apparatus for evaluating a signal of a rotational angle sensor, having a first processing unit, a second processing unit and an analysis device. The first processing unit comprises a bandpass filter and a first calculation unit. The bandpass filter is configured to attenuate, or optionally fully block, frequency components below and above a predetermined frequency range. The bandpass filter is furthermore configured to suppress a DC component of the signal of the rotational angle sensor. The bandpass filter then provides a first filtered signal. The first calculation unit is configured to calculate a first angle value on the basis of the first filtered signal. The second processing unit comprises a lowpass and bandpass filter, as well as a second calculation unit. The lowpass and bandpass filter is configured to attenuate, or optionally fully block, frequency components above a predetermined cutoff frequency. The lowpass and bandpass filter then provides a second filtered signal. The second calculation unit is configured to calculate a second angle value on the basis of the second filtered signal. Furthermore, the analysis device is configured to compare the first calculated angle value and the second calculated angle value with one another.

According to another aspect, the present invention provides a method for evaluating a signal of a rotational angle sensor.

Accordingly, the present invention provides a method having the steps of receiving a signal of the rotational angle sensor and of applying bandpass filtering to the received signal of the rotational angle sensor. A first filtered signal is then obtained, frequency components below and above a predetermined frequency range being attenuated, or optionally fully stopped. At the same time, DC components of the received signal are suppressed. The method furthermore comprises a step of calculating a first angle value on the basis of the first filtered signal. Furthermore, the method comprises a step of applying combined lowpass and bandpass filtering to the received signal of the rotational angle sensor. In this way, a second filtered signal is obtained, frequency components above a predetermined cutoff frequency being attenuated, or optionally fully blocked. Subsequently, a second angle value is calculated on the basis of the second filtered signal. The method furthermore comprises a step of comparing the calculated first angle value with the calculated second angle value.

The present invention is based on the idea of processing a signal provided by a rotational angle sensor in two different signal paths, and subsequently comparing the results with one another. The processing in a first signal path is in this case configured for maximally precise determination of the rotational angle, while the processing in the second signal path is optimized for error detection. By the use of a bandpass filter in the first signal path, possible perturbations due to DC components or an offset are in this case eliminated. The determination of the rotational angle can therefore be improved. In the other signal path, on the other hand, although the determination of the rotational angle is made more difficult by inclusion of the DC component, this DC component is at the same time nevertheless still available for possible error detection, and may be included in the corresponding processing.

Besides the use of different filter properties in the two signal paths, the signal paths may furthermore also be optimized further for the respective applications, i.e. angle quality in the first signal path and diagnosability of errors in the second signal path. In particular, processing with a higher accuracy requirement than in the second signal path may in this case be implemented in the first signal path.

According to one embodiment, the first processing unit comprises a first sampling device, which is configured to sample the first filtered signal with a first sampling frequency. Furthermore, the second processing unit comprises a second sampling device, which is configured to sample the second filtered signal with a second sampling frequency. The first calculation unit in this case calculates the first angle value on the basis of the sampled first filtered signal. The second calculation unit calculates the second angle value on the basis of the sampled second filtered signal. In this way, it is possible to adapt the sampling rate for the signal in each signal path to the corresponding application, i.e. for optimization in respect of angle quality or diagnosability of errors.

According to another embodiment, the first sampling frequency is greater than the second sampling frequency. In this way, for precise determination of the angle, the processing may be configured with a high sampling rate, i.e. with a large number of sampled values. At the same time, the error diagnosis may be configured with a lower sampling rate and therefore with lower demands on the calculation power.

According to another embodiment, the first sampling device comprises a delta-sigma analog-to-digital converter (DS-ADC). In particular, the DS-ADC may in this case be operated in a differential mode. Furthermore, DS-ADC allow very rapid sampling up to, for example, 3 µs. Very many sampled values may therefore be provided for very precise angle determination.

According to another embodiment, the second sampling device comprises a successive approximation register analog-to-digital converter (SAR-ADC). In particular, the SAR-ADC may in this case be operated in a single-ended mode. In this way, the voltage values of the signal provided by the rotational angle sensor can be recorded absolutely. This is advantageous for electrical diagnosis, for example detection of short circuits or breaks.

According to another embodiment, the first calculation unit processes the signal of the rotational angle sensor on the basis of a voltage difference between a first signal line and a second signal line. Furthermore, the second calculation unit processes the signal of the rotational angle sensor on the basis of a first voltage between the first signal line and a reference potential and a second voltage between the second signal line and the reference potential. In this way, the angle signal may be determined in the first signal path without a perturbing DC component. Furthermore, the DC component is available for the error diagnosis in the second signal path.

According to another aspect, the present invention provides a drive system having an electric motor, a rotational angle sensor, and an apparatus according to the invention for evaluating the signal of the rotational angle sensor. The electric motor is configured to drive a drive shaft. The rotational angle sensor is coupled to the drive shaft of the electrical drive. Furthermore, the rotational angle sensor is configured to deliver an electrical signal which corresponds to the relative position of the drive shaft.

According to one embodiment of the drive system, the rotational angle sensor comprises a resolver. Resolvers deliver an absolute angle signal within one revolution, and do not therefore need to be referenced after switching on. Resolvers are therefore very highly suitable as rotational angle sensors.

According to one embodiment of the method for evaluating a signal, the step of receiving a signal of the rotational angle sensor receives two mutually phase-shifted signals from a resolver.

Other advantages and embodiments may be found in the following description with reference to the appended drawings.

DETAILED DESCRIPTION

Figure 1:
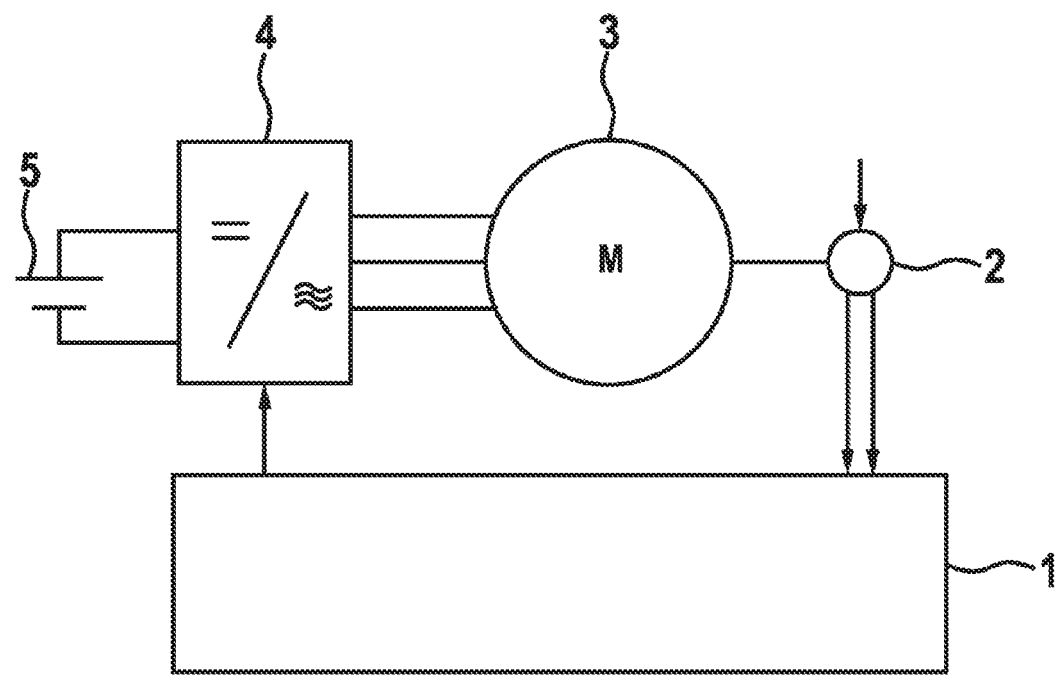
FIG. 1 shows a schematic representation of an electrical drive system according to one embodiment.

FIG. 1 shows a schematic representation of an electrical drive system according to one embodiment. An electrical machine 3 is supplied by an electrical energy source 5 through a power converter 4. For example, the electrical energy source 5 may be a traction battery of an electrical vehicle. The electrical machine 3 may, for example, be a permanently excited synchronous machine, an electrically excited synchronous machine, or an asynchronous machine. In principle, furthermore, other electrical machines are also possible. The embodiment represented here of a three-phase electrical machine 3 constitutes only an exemplary embodiment. Furthermore, electrical machines having a number of phases other than three are also possible. The power converter 4 converts the electrical energy provided by the electrical energy source 5 and provides the converted electrical energy for driving the electrical machine 3. The driving of the electrical machine 3 may in this case be carried out on the basis of specifications or control signals of the control apparatus 1. Furthermore, during braking of the electrical machine 3, kinetic energy may also be converted into electrical energy by the electrical machine 3, and this electrical energy may be fed via the power converter 4 into an electrical energy storage unit of the energy source 5.

For the regulation of a permanently or electrically excited synchronous machine, knowledge about the position of the rotor in this machine is in this case required. Furthermore, knowledge of the electrical frequency of such a machine is required for the regulation of asynchronous machines. To this end, the electrical machine 3 may be coupled to a rotational angle sensor 2. For example, the rotational angle sensor 2 may be coupled to the drive shaft of the electrical machine 3. For example, sensors based on the eddy current effect, digital angle sensors or so-called resolvers are possible for determining the rotor position and/or the electrical frequency of the machine 3.

In a resolver, two stator windings electrically offset by 90° are generally arranged in a housing, these windings enclosing a rotor which has a rotor winding and is mounted in the housing. In principle, various alternatives for determining the angular position are possible, of which one possibility will be described below by way of example. For example, the rotor winding of the resolver may be excited with a sinusoidal AC voltage. The amplitudes of the voltages induced in the two stator windings of the resolver are in this case dependent on the angular position of the rotor and correspond to the sine and the cosine of the angular position of the rotor. The angular position of the rotor can therefore be calculated from the arctangent (arctan) of the signals of the two stator windings of the resolver.

In order to be able to ensure sufficient reliability during the signal processing, and particularly also during the regulation of an electrical drive, it is desirable to be able to verify the signals provided by a rotational angle sensor, for example a resolver, and when appropriate also to be able to diagnose errors and perturbations in the signals. For example, an electrical drive system may have an interface through which control signals can be transmitted to the power electronics and sensor signals, for example including the output signals of a rotational angle sensor, are provided. Besides the pure evaluation of these signals of the rotational angle sensor, these signals may furthermore also be checked for plausibility and errors.

Figure 2:
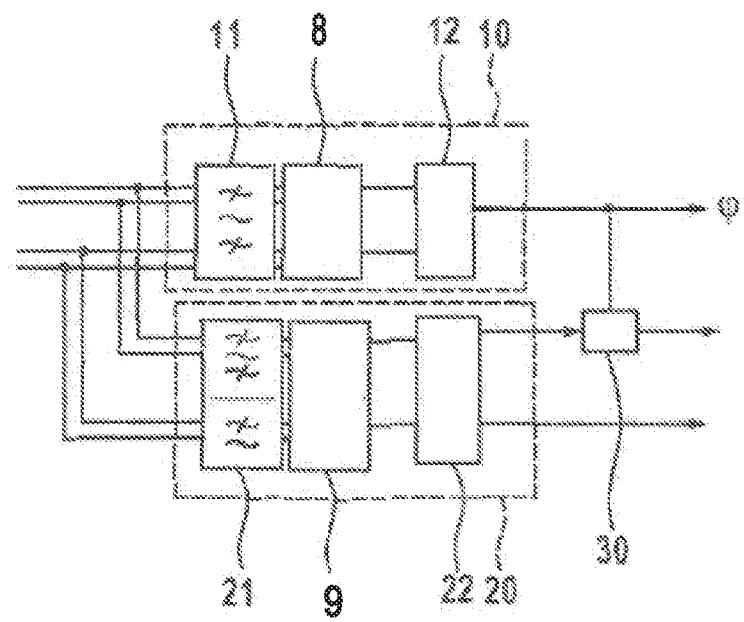
FIG. 2 shows a schematic representation of an apparatus for processing an angle signal according to one embodiment.

FIG. 2 shows a schematic representation of an apparatus for evaluating a signal of a rotational angle sensor according to one embodiment. The apparatus for evaluating a signal of a rotational angle sensor in this case comprises a first processing unit 10, a second processing unit 20, as well as an analysis device 30. Even though the evaluation of the signals of a rotational angle sensor is described in the following exemplary embodiment in connection with two output signals of a resolver, this exemplary representation does not constitute any restriction of the present invention. Rather, the inventive evaluation of the signals of a rotational angle sensor may also be applied to output signals of other rotational angle sensors, or even to other angle-related signals. Furthermore, the inventive evaluation of the signals may also be applied to signals of other sensors. The use is in this case not necessarily limited to angle signals.

The apparatus for evaluating a signal of a rotational angle sensor in this case receives, for example, the raw signals of a rotational angle sensor. For example, these raw signals may be the sine signal and the cosine signal of a resolver. These signals may, for example, be provided via a standardized interface or any other desired connection. The apparatus for evaluating the signal of a rotational angle sensor furthermore evaluates, as will be explained in more detail below, the signals of the rotational angle sensor separately in two different methods. In this case, one evaluation of the signals of the rotational angle sensor is configured for a high quality of the reconstructed angle signal. The other evaluation of the signals of the rotational angle sensor, on the other hand, is configured for maximally efficient and informative diagnosability of possible errors.

In the first signal path, processing of the signals of the rotational angle sensor is carried out with the aim of maximally high angle quality for the further signal processing, or regulation. If each signal (for example the sine signal and the cosine signal of a resolver) is respectively transmitted through two signal lines, then for example differential measurement of the voltage between these two signal lines may be carried out in the first processing path. Such transmission of a signal through two signal lines in this case allows transmission of the signal in a way which is free from a reference potential. By such a differential measurement between the two signal lines of a signal of the rotational angle sensor, common-mode perturbations, for example an offset on the signal lines, are therefore suppressed, so that such perturbations have no effect on the further evaluation of the angle signal. Furthermore, the signals of the rotational angle sensor may be filtered in the first processing unit 10 by means of a bandpass filter 11. Such a bandpass filter in this case attenuates, or suppresses, frequency components in the signal of the rotational angle sensor which lie below a first frequency or above a second cutoff frequency. Frequency components between the first and the second cutoff frequency, on the other hand, are not attenuated, or are attenuated only very little. In particular, the DC component in the signal of the rotational angle sensor may also be suppressed by such a bandpass filter 11. In some embodiments, the first processing unit 10 comprises a first sampling device 8, which is configured to sample the first signal with a first sampling frequency. The second processing unit 20 may also comprise a second sampling device 9, which is configured to sample the second signal with a second sampling frequency. If the signals of the rotational angle sensor are initially present in analog form, then the signals may for example also be sampled and digitized in the first processing unit 10 by an analog-to-digital converter, which is operated in a differential mode. For example, such an analog-to-digital converter may be a delta-sigma analog-to-digital converter (DS-ADC). Such analog-to-digital converters allow very rapid sampling of input signals. For example, the input signals may be sampled with a sampling rate of up to 3 µs. At the same time, a DC voltage offset in the signal of the rotational angle transducer may be suppressed by such analog-to-digital converters in a differential mode. Other analog-to-digital converters, in particular analog-to-digital converters having a differential operating mode, are likewise possible.

Subsequently, evaluation of the above-described processed signals of the rotational angle sensor is carried out in the first processing unit 10 by a first calculation unit 12 in order to determine a first angle value. This first calculation unit 12 in this case processes the bandpass-filtered digitized signals of the rotational angle sensor with a high processing speed, i.e. in a very highly cycled computation grid. The calculation of the first angle value by the first calculation unit 12 is in this case carried out by means of conventional known algorithms for reconstructing the angle value from the signals of the rotational angle sensor. As an alternative, new types of algorithms may of course also be used for reconstructing the rotational angle from the signals of the rotational angle sensor.

By the above-described processing and filtering of the signals of the rotational angle sensor and the rapidly cycled calculation of the angle value in the first processing unit 10, an angle signal having a high quality can therefore be provided. The processing, and in particular the filtering, in this case make it possible to eliminate a DC voltage component in the signal of the rotational angle sensor, so that the reconstructed angle signal is not influenced, or vitiated, by such DC voltage components.

In parallel with the calculation of the angle value in the first processing unit 10, at the same time calculation of a second angle value is also carried out by a second processing unit 20. This second processing unit 20 may in this case, for example, separately record a signal, provided by two signal lines, of a rotational angle sensor by means of a single-ended measurement between each of the signal lines and a reference potential. By this separate recording of the two voltages on the two signal lines, for example, electrical diagnosis that makes it possible to detect a common-mode perturbation in the input signals is possible. A short circuit of a signal line to ground or another voltage potential may also be detected very simply in this way. The second processing unit 20 furthermore comprises a combined lowpass and bandpass filter 21. Such a lowpass and bandpass filter 21 in this case attenuates, or suppresses, frequency components above a predetermined cutoff frequency. Frequency components below this cutoff frequency, on the other hand, are not attenuated, or are attenuated only to a very small extent. In particular, such a lowpass and bandpass filter 21 is capable of transmitting DC voltage components, so that these DC voltage components can be detected in subsequent evaluation. In this case, the lowpass component part of the combined lowpass and bandpass filter 21 may also have a cutoff frequency which lies below the lower cutoff frequency of the bandpass component part of the combined lowpass and bandpass filter 21. In this way, it is also possible to attenuate frequency components which lie between the cutoff frequency of the lowpass component part and the lower cutoff frequency of the bandpass component part.

The cutoff frequencies of this combined lowpass and bandpass filter 21, as well as the first and second cutoff frequencies of the bandpass filter 11 of the first processing unit 10, may in this case be rigidly predetermined while taking the system-relevant component parts into account. As an alternative, it is also possible to vary, and optionally dynamically adapt, the respective cutoff frequencies.

Furthermore, it is also possible that the combined lowpass and bandpass filter 21 does not let a DC voltage component pass through fully unimpeded, but that this DC voltage component experiences a certain attenuation. In particular, the lowpass and bandpass filter 21 may be configured in such a way that the attenuation for a DC voltage component is greater than the attenuation for the useful signal which the bandpass component part of the combined lowpass and bandpass filter 21 transmits. For example, the useful signal may be a signal with a frequency of about 10 kHz. By attenuation of the DC voltage component in the combined lowpass and bandpass filter 21, for example, the shunt stability of the system may be increased.

If the signals of the rotational angle sensor are present in analog form, then the signals may also be converted into digital signals by an analog-to-digital converter in the second processing unit 20. For this purpose, in particular, a so-called successive approximation register analog-to-digital converter (SAR-ADC) is possible in the second processing unit 20. Furthermore, other analog-to-digital converters are of course also possible. If the analog-to-digital converter is in this case operated in a single-ended mode, then in particular the absolute voltage values may in this case be determined on the individual lines on which the raw angle signal is provided by the rotational angle sensor. Electrical diagnosis is possible in this way, including in particular diagnosis of voltage offsets. In the second signal path of the second processing unit 20, much slower processing and digitizing of the angular position signals is in this case sufficient for the error diagnosis, compared with what is required for the processing by the first processing unit 10. In this way, in particular, use of robust and economical constituent parts is possible. In the second processing unit 20, furthermore, the choice of the constituent parts and of the evaluation algorithms may also be optimized for the diagnosability of perturbations or errors, without a particularly high signal processing speed being required for this.

The second processing unit 20 may therefore directly deduce a possible perturbation of the rotational angle sensor, or a fault in the signal lines between the rotational angle sensor and the circuit arrangement for the evaluation of the rotational angle sensor signals, by evaluating the signals of the rotational angle sensor. Furthermore, the angle signals of the first processing unit 10 and of the second processing unit 20 may be compared with one another in an analysis device 30. If the analysis device 30 in this case finds a discrepancy between the two calculated angle values, an error in the processing of the angle signals may likewise be deduced therefrom. The results of this comparison of the two angle values, and when appropriate an error detected by the second processing unit 20, may in this case be provided together or separately, in order to generate a possible error signal therefrom. This error signal may in this case be recorded and evaluated by a motor controller or a superordinate system monitoring component part.

Figure 3:
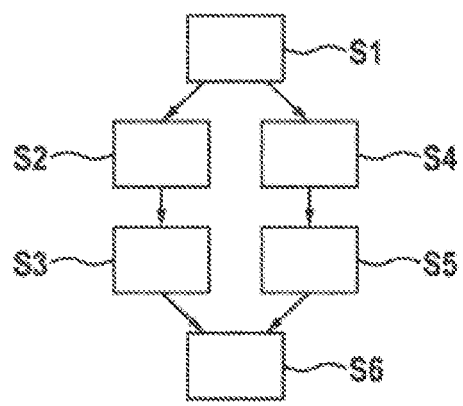
FIG. 3 shows a schematic representation of a flow chart as forms the basis for a method according to one embodiment.

FIG. 3 shows a schematic representation of a method for evaluating a signal in a rotational angle sensor. In a first step S1, a signal of a rotational angle sensor is received. In a step S2, bandpass filtering is applied to this signal of the rotational angle sensor. By this bandpass filtering, a first filtered signal is obtained. In this first filtered signal, frequency components below and above a predetermined frequency range are attenuated. In particular, a DC component of the received signal is also suppressed by this bandpass filtering. On the basis of this first filtered signal, a first angle value may be calculated in step S3.

In step S4, combined lowpass and bandpass filtering is furthermore applied to the received signal of the rotational angle sensor. In particular, frequency components above a predetermined cutoff frequency are attenuated by this combined lowpass and bandpass filtering. Furthermore, frequency components between the cutoff frequency of the lowpass component part of the lowpass and bandpass filter and the lower cutoff frequency of the bandpass component part of the lowpass and bandpass filter may also be attenuated. A possible DC component in the signal of the rotational angle sensor may furthermore also be attenuated. Although a possible DC component is attenuated in this case, in contrast to the bandpass filtering in step S2 it is not fully blocked. The signal filtered by the combined lowpass and bandpass filtering is output as a second filtered signal. On the basis of the second filtered signal, calculation of a second angle value is then carried out in step S5. In step S6, the calculated first angle value and the calculated second angle value may then be compared with one another. A possible error in the rotational angle sensor or in the signal route from the rotational angle sensor to the evaluation circuit may then when appropriate be deduced from this comparison.

In particular, the signal of the rotational angle sensor may comprise two mutually phase-shifted signals of a resolver. Each of these signals of the resolver, or alternatively of a different rotational angle sensor, may in this case be transmitted through two conductors electrically insulated from one another. This allows reference potential-free transmission of the signal, which may be provided reference potential-free because of the inductive principle of the resolver. In particular, DC isolation between the reference potential and the signal of the rotational angle sensor is also possible in this way.

In summary, the present invention relates to twofold evaluation of signals of a rotational angle sensor. In this case, in a first signal path the signal of the rotational angle sensor is processed with a view to maximally high angle quality of the angle signal to be calculated. A second signal path for processing the signal of the rotational angle sensor, on the other hand, is optimized for best possible diagnosability of errors.

The invention claimed is:

1. An apparatus for evaluating a signal of a rotational angle sensor (2), the apparatus configured to:
   receive, separately at a first processing unit (10) and at a second processing unit (20), a measurement signal from the rotational angle sensor (2);
   apply, via the first processing unit (10), a bandpass filter (11) to attenuate frequency components below and above a predetermined frequency range and to suppress a DC component of the signal from the rotational angle sensor (2) received at the first processing unit (10), producing a first filtered signal;
   apply, via the second processing unit (20), a lowpass and bandpass filter (21) to attenuate frequency components of the signal from the rotational angle sensor (2) received at the second processing unit (20) above a predetermined cutoff frequency, producing a second filtered signal;
   calculate a first angle value, via a first calculation unit (12), based on the first filtered signal;
   calculate a second angle value, via a second calculation unit (22), based on the second filtered signal;
   compare, via an analysis device (30) the calculated first angle value with the calculated second angle value; and
   determine an error in a processing of the angle signals in response to detecting a discrepancy between the first angle value and the second angle value.

2. The apparatus as claimed in claim 1, wherein the first processing unit (10) comprises a first sampling device, configured to sample the first filtered signal with a first sampling frequency;

and the second processing unit (20) comprises a second sampling device, configured to sample the second filtered signal with a second sampling frequency;

and wherein the first calculation unit (12) calculates the first angle value on the basis of the sampled first filtered signal and in the second calculation unit (22) calculates the second angle value on the basis of the sampled second filtered signal.

3. The apparatus as claimed in claim 2, wherein the first sampling frequency is greater than the second sampling frequency.

4. The apparatus as claimed in claim 2, wherein the first sampling device comprises a delta-sigma analog-to-digital converter (DS-ADC).

5. The apparatus as claimed in claim 2, wherein the second sampling device comprises a successive approximation register analog-to-digital converter (SAR-ADC).

6. The apparatus as claimed in claim 1, wherein the first calculation unit (12) processes the signal of the rotational angle sensor (2) on the basis of a voltage difference between a first signal lines and a second signal line; and the second processing unit (22) processes the signal of the rotational angle sensor (2) on the basis of a first voltage between the first signal line and a reference potential and a second voltage between the second signal line and the reference potential.

7. A drive system, having:

an electric motor (3), configured to drive a drive shaft;

a rotational angle sensor (2), coupled to the drive shaft of the electric motor (3) and configured to deliver an electrical signal which corresponds to the relative position of the drive shaft;

an apparatus for evaluating a signal of a rotational angle sensor (2) as claimed in claim 1.

8. The drive system as claimed in claim 7, wherein the rotational angle sensor (2) comprises a resolver.

9. A method for evaluating a signal of a rotational angle sensor (2), having the steps:

receiving (S1), separately at both a first processing unit and a second processing unit, a measurement signal from the rotational angle sensor (2);

applying (S2), via the first processing unit, bandpass filtering to the received measurement signal of the rotational angle sensor in order to obtain a first filtered signal, frequency components below and above a predetermined frequency range being attenuated and a DC component of the received signal being suppressed;

calculating (S3) a first angle value on the basis of the first filtered signal;

applying (S4), via the second processing unit, combined lowpass and bandpass filtering to the received signal of the rotational angle sensor in order to obtain a second filtered signal, frequency components above a predetermined cutoff frequency being attenuated;

calculating (S5) a second angle value on the basis of the second filtered signal;

comparing (S6) the calculated first angle value with the calculated second angle value; and determining an error in a processing of the angle signals in response to detecting a discrepancy between the first angle value and the second angle value to detect an error.

10. The method as claimed in claim 9, wherein the step (S1) of receiving a signal of the rotational angle sensor (2) includes receiving two mutually phase-shifted signals from a resolver.

* * * * *